W. J. GELINK.
SULKY OR WHEELED CULTIVATOR.
APPLICATION FILED SEPT. 9, 1913.
1,117,027.
Patented Nov. 10, 1914.
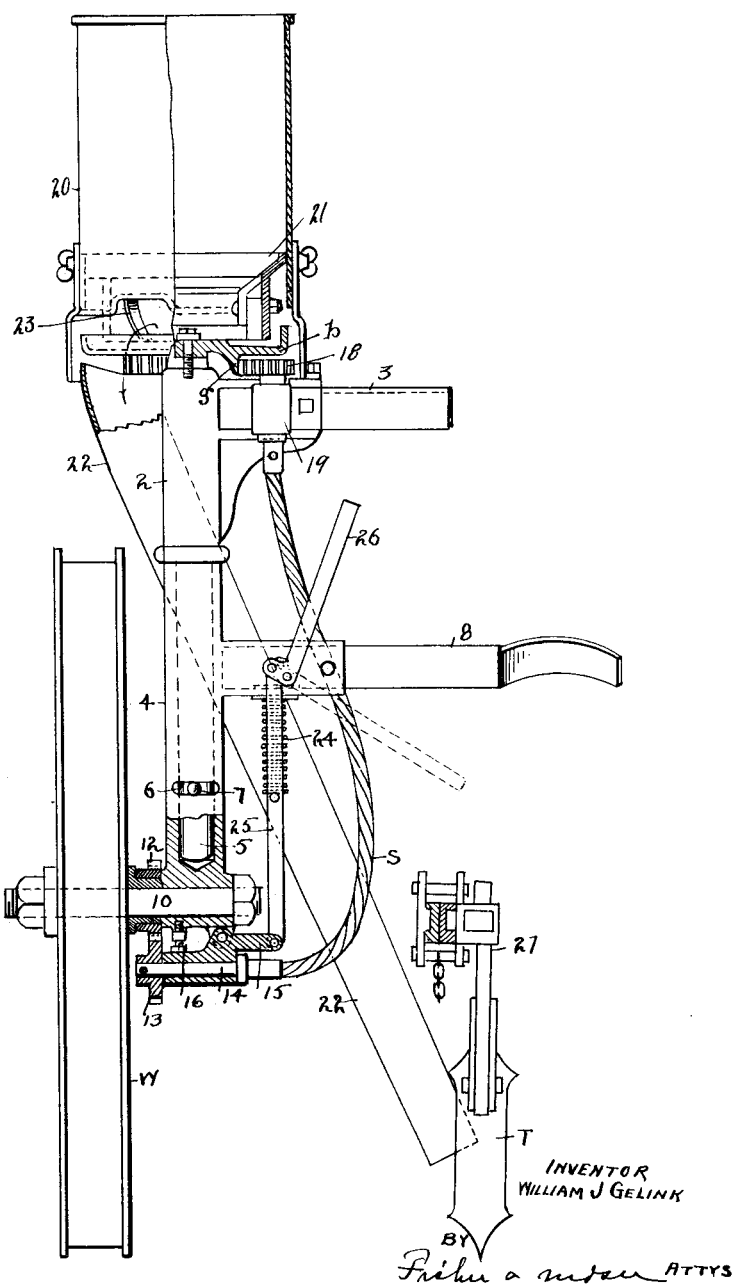

UNITED STATES PATENT OFFICE.

WILLIAM J. GELINK, OF AKRON, OHIO, ASSIGNOR TO THE AKRON CULTIVATOR COMPANY, OF AKRON, OHIO, A CORPORATION.

SULKY OR WHEELED CULTIVATOR.

1,117,027.  Specification of Letters Patent.  Patented Nov. 10, 1914.

Application filed September 9, 1913. Serial No. 788,905.

*To all whom it may concern:*

Be it known that I, WILLIAM J. GELINK, a citizen of the United States, residing at Akron, in the county of Summit and State of Ohio, have invented certain new and useful Improvements in Sulky or Wheeled Cultivators, of which the following is a specification.

This invention has reference to sulky or wheeled cultivators of the type having rotary axles and a fertilizer distributer carried and operated thereby, so that fertilization may go with cultivation, all substantially as shown and described and particularly pointed out in the claims.

In the accompanying drawings, the single figure shown is an elevation partially in section of one side of a wheeled or sulky cultivator of the pivot axle type and having certain novel improvements in itself and a fertilizer distributing mechanism mounted on said frame and operatively connected with said wheel, it being of course understood that the other side of the cultivator is a complete duplication of the one shown herein.

As shown, the frame of the cultivator comprises an upright standard consisting of an upper bracket shaped section 2 rigid through cross portion 3 with the complete frame of the machine and a lower tubular section or portion 4, described as the axle section and rotatably mounted on a stem 5 extending down from section 2 and provided with a transverse slot 6 working over a limiting pin 7 on said stem. A foot lever 8 on section 4 serves to rotate the same and to change the direction of the carrying wheel w accordingly. The said wheel is mounted on a spindle 10 fixed in the lower end of said section 4 and has a pinion 12 fitted on the hub thereof and in mesh, normally, with a spur gear 13 mounted on the rigid extremity or spindle 14 of an otherwise flexible shaft S. A bearing 15, pivoted on the bottom or lower end of standard section 4 has a bore axially serving as a support for spindle 14, and the set screw 16 serves to fix the depth at which the gears 12 and 13 may engage. Ordinarily, a not very deep engagement is found best because it is desirable to have accommodation associated with said engagement to allow cogs to jump or slip in case of possible obstruction somewhere in the connections which might cause breakage if relief were not afforded. As it is, if say the fertilizer distributer becomes choked or obstructed so that it cannot feed the gears 12 and 13 will simply slip cogs and breakage be averted. The said spindle 14 serves as the immediate end of the flexible shaft S and through which power is transmitted to the distributer bottom $b$ by a gear $g$ on the lower side of said bottom meshed by a pinion 18 on the rigid upper end of shaft S and which has a bearing 19 on cross bar 3. As herein shown the bottom $b$ is mounted directly upon the top of the upper section 2 of the standard and the receptacle 20 for the fertilizer is mounted over said bottom $b$ and the fertilizer feeds through said receptacle and hopper 21 therein onto the peripheral portion of said bottom and thence into the delivery spout 22, a device 23 on hopper 21 plowing the material into said hopper over the edge of said bottom.

The gears 12 and 13 are held normally in engagement by the spring 24 on the rod or link 25 which connects the bearing member 14 with the operating lever 26 and serves to depress said link and maintain the operating position of said member, but the lever 26 has a crank end to which the link 25 is connected, and when said lever is depressed, as in dotted lines, and thrown across its pivot the said bearing or member 14 is tilted downward at its outer end and the said gears are disengaged. The lever 26 is close to the foot lever 8 and can be thrown by the foot into either position while the machine is in motion. This makes the operation convenient at the ends of rows or at other times and places when the cultivator is in motion but fertilizer is not wanted.

The spout 22 is more or less inclined laterally to supply fertilizer either front or rear of the cultivator tooth T, in the gang 27, and may be positioned near to or apart from said tooth as may seem best and with any tooth in the gang. However, proximity to either the first or second tooth front is usually best as this brings the fertilizer most directly where it can be reached by the plants. It is also deemed good practice to drop the fertilizer where it will be more or less completely covered by and incorporated with the soil.

What I claim is:

1. In a machine as described, a fixed main frame comprising a bracket section at its side provided with a cylindrical stem at its bottom, a tube rotatably mounted on the said stem and having a head at its bottom, a wheel spindle fixed in said head and a wheel thereon and a pinion on the hub of said wheel, in combination with a flexible shaft and a gear thereon meshing with said pinion, a bracket pivoted on said head supporting said gear and said shaft and a lever and means to operate said bracket and disengage said gear.

2. In a mechanism as described, a main frame, a horizontally rotatable axle supported therefrom and a wheel thereon, a pinion on the hub of said wheel and a fertilizer distributer mounted over said axle and wheel, in combination with a flexible shaft having a gear in mesh with said pinion and operatively connected with said distributer, a pivoted support for the lower end of said shaft, a link and a lift lever controlling said support on its pivot, and a spring upon said link adapted to press said gear and pinion into mesh.

3. The frame of the cultivator and a fertilizer distributer mounted on the side and top thereof, in combination with means to operate the said distributer comprising a carrying wheel substantially beneath said distributer and horizontally rotatable means supporting said wheel from said frame, a flexible shaft and gears to drive the same from said wheel, said shaft being operatively engaged with the said distributer, a pivoted support carrying the actuating end of said shaft and means to tilt said support, a set screw adapted to fix the working position of said support and thereby control the depth of mesh of said gears and a spring pressed mechanism adapted to yield and accommodate possible slip movements between said gears.

In testimony whereof I affix my signature in presence of two witnesses.

WILLIAM J. GELINK.

Witnesses:
H. B. FITCH,
L. B. FRISCH.

Copies of this patent may be obtained for five cents each, by addressing the "Commissioner of Patents. Washington, D. C."